United States Patent
Salomon

(10) Patent No.: US 7,297,879 B2
(45) Date of Patent: *Nov. 20, 2007

(54) METHOD AND APPARATUS FOR DETERMINING THE MASS OF AN ARTICLE USING A LOAD CELL

(75) Inventor: James A. Salomon, Cheshire, CT (US)

(73) Assignee: Pitney Bowes Inc., Stamford, CT (US)

( * ) Notice: Subject to any disclaimer, the term of this patent is extended or adjusted under 35 U.S.C. 154(b) by 256 days.

This patent is subject to a terminal disclaimer.

(21) Appl. No.: 11/129,019

(22) Filed: May 13, 2005

(65) Prior Publication Data

US 2005/0205307 A1    Sep. 22, 2005

Related U.S. Application Data

(63) Continuation of application No. 08/364,144, filed on Dec. 27, 1994, now Pat. No. 6,940,025.

(51) Int. Cl.
  *G01G 9/00* (2006.01)
(52) U.S. Cl. .................. 177/1; 177/25.15; 705/407
(58) Field of Classification Search .................. 177/1, 177/25.15, 145; 705/407; 73/865
  See application file for complete search history.

(56) References Cited

U.S. PATENT DOCUMENTS

| | | | | |
|---|---|---|---|---|
| 3,679,010 A | * | 7/1972 | Bullivant | 177/16 |
| 3,805,904 A | * | 4/1974 | Zimmerer | 177/54 |
| 3,834,474 A | * | 9/1974 | Knol | 177/1 |
| 3,917,989 A | * | 11/1975 | Bereisa, Jr. | 318/801 |
| 4,757,867 A | * | 7/1988 | Rosenthal et al. | 177/255 |
| 4,963,810 A | * | 10/1990 | Rojas et al. | 318/778 |
| 5,094,306 A | * | 3/1992 | Cohen et al. | 177/145 |
| 5,126,647 A | * | 6/1992 | Blackburn et al. | 318/599 |
| 5,230,391 A | * | 7/1993 | Murata et al. | 177/50 |
| 5,258,579 A | * | 11/1993 | Wakasa | 177/25.14 |
| 5,294,756 A | * | 3/1994 | Lauber et al. | 177/119 |
| 5,308,932 A | * | 5/1994 | Manduley et al. | 177/25.15 |
| 5,393,939 A | * | 2/1995 | Nasuta et al. | 177/145 |
| 5,547,034 A | * | 8/1996 | Wurz et al. | 177/25.13 |
| 5,736,685 A | * | 4/1998 | Nakajima | 177/145 |

\* cited by examiner

*Primary Examiner*—Randy W Gibson
(74) *Attorney, Agent, or Firm*—Ronald Reichman; Angelo N. Chaclas

(57) ABSTRACT

A method of determining the mass of a mail piece using a load cell. A mail piece whose mass is to be determined is transported across a platform without stopping or slowing the mail piece. A load cell measures the horizontal force applied to the load cell by the transported mail piece. This horizontal force, along with the acceleration of the mail piece, allows a determination of the mass of the mail piece.

5 Claims, 5 Drawing Sheets

US 7,297,879 B2

METHOD AND APPARATUS FOR DETERMINING THE MASS OF AN ARTICLE USING A LOAD CELL

CROSS REFERENCE TO RELATED APPLICATIONS

This application is a continuation of U.S. patent application Ser. No. 08/364,144 filed Dec. 27, 1994, now U.S. Pat. No. 6,940,025 and assigned to the assignee of the present invention. This application is specifically incorporated herein in its entirety by reference.

BACKGROUND OF THE INVENTION

The subject invention relates to a method for rapidly determining the mass of a mail piece.

Mailing systems where a mail piece is transported onto a postal scale, the appropriate postage is determined and used to set a postage meter, and the mail piece is then transported to the postage meter for imprinting with a postal indicia representative of the postage amount are known. One such system is described in U.S. Pat. No. 4,742,878, issued May 10, 1988 to the assignee of the subject invention. In such systems, there is a constant need to increase the rate at which the scale can determine the mass of a mail piece in order that the throughput of the system can be increased. Heretofore, weighing devices for such mail processing systems have been developed, but these generally have been rather slow. Actually, many prior weight devices combined a standard scale with a mechanism that would stop the mail to allow weighing to take place. These systems require large transports and high acceleration and deceleration rates. To keep pace with a high throughout rate, multiple scales would be used with alternate mail pieces diverted to such scales.

A separate approach for providing high throughput mailing systems has been the use of vibrating tray scales to determine the mass of a mail piece where the mass is estimated as a function of the frequency at which a scale tray vibrates after a mail piece is placed upon it and the system is excited. Such a system is described in U.S. Pat. No. 5,082,072. While such prior art systems have proven generally satisfactory, there is still a need for a method of operation which is suitable for use with load cell technology while still providing desired high throughput rates of at least three mail pieces per second for mailing systems.

SUMMARY OF THE INVENTION

It is therefore an object of the present invention to provide a method for determining the mass of an article in motion. For the purpose of determining the mass of the article, a platform and an associated means for transporting the article are mounted on resilient support means. A load cell is oriented in such a manner as to measure a horizontal force applied to the load cell by the transported article. The transporting means moves the article across the platform, without stopping, in accordance with a known acceleration profile. While the article is in motion, a load cell measures the horizontal force acting on the load cell. The horizontal force is then correlated with the acceleration rate of the article in order to determine the mass of the article.

In another embodiment of the invention, a multiple frequency, time varying velocity profile is applied to a servo motor which controls the motion of the article. The current output of the motor passes through a current limiter. Predetermined weight breaks are identified by predetermining which frequency will saturate the current limiter for an article of a known mass. For each frequency, with the transported article on the platform, the output of the current limiter is measured. By comparing the frequency of the velocity signal when the motor is current limited against the predetermined frequencies which saturate the current limiter, the mass of the article is rapidly determined.

BRIEF DESCRIPTION OF THE DRAWINGS

These and other objects and advantages of the present invention will become apparent from the following description of the accompanying drawings. It is to be understood that the drawings are to be used for the purpose of illustration only, and not as a definition of the invention. In the drawings.

DESCRIPTION OF THE PREFERRED EMBODIMENT

Figure 1:
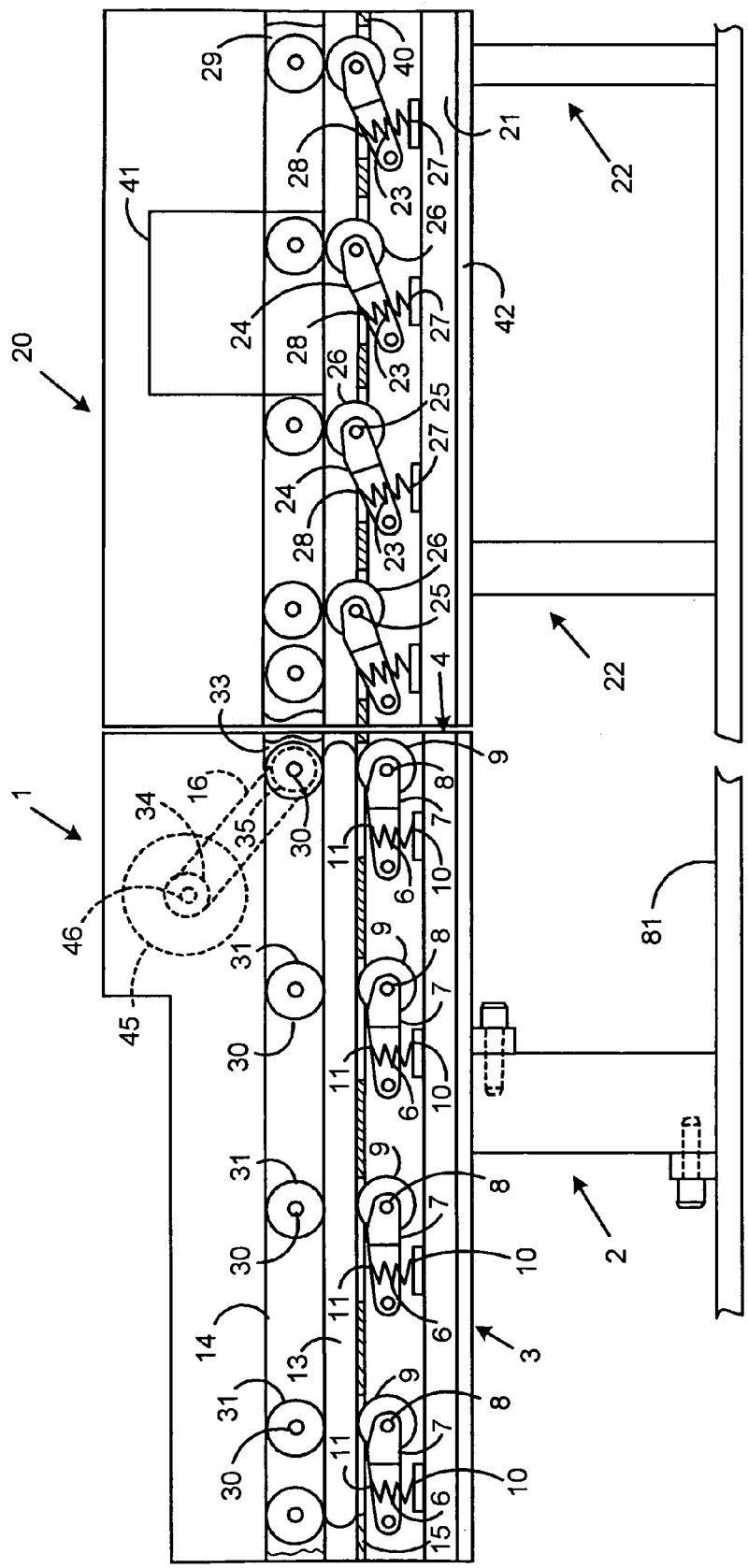
FIG. 1 is a side elevation view of the weighing conveyer with a separate metering module.

FIG. 1 illustrates the weighing conveyer 1 of the present invention. The conveyer 1 is interposed between a suitable feeding module (not shown) from which mail pieces 13 are fed seriatim to the weighing conveyer 1 where they are weighed prior to a postage indicia being printed thereon by a postage meter module 20. The weighing conveyer 1 is comprised of a load cell 2 and a resilient base 81. Preferably base 81 is formed of a vibration damping material, as is taught in U.S. Pat. No. 4,479,561, to Feinland et al. Thus, as mail piece 13 is transported, external vibrations are not felt by the load cell 2 but are isolated from ground by base 81. Such a system is described, for example, in commonly assigned U.S. Pat. No. 5,082,072 which is hereby incorporated by reference.

With reference to FIG. 1, the weighing conveyer 1 has a pair of stanchions 80 fixedly mounted to frame 3. Secured to the upper end of frame 3 is a bracket 4 which supports a platform 15 for receiving a mail piece from the aforementioned feeding module, and a plurality of springs 6 to which paired arms 7 are attached, there being pins 8 extending between and joining the paired arms 7, each pin 8 supporting an idler roller 9. The plurality of springs 6 having a first tang 10 that abuts the bracket 4 and a second tang 11 that is in engagement with the upper part 12 of one of the paired arms 7. With this construction, the arms 7 are biased towards a mail piece 13, shown in a position in which its weight would be determined by the load cell 2. Because of the biasing action of the springs 6 upon the arms 7, the rollers 9 will engage a mail piece 13 and urge it against the belt 14 until such time as the mail piece 13 exits the weighing conveyer 1.

On the downstream side of the weighing conveyer 1 is the metering module 20 for imprinting a mail piece 13 with an indicia. With reference to FIG. 1, the metering module 20 is comprised of a printer 41 and a pair of stanchions 22 fixedly mounted to frame 42. Secured to the upper end of the stanchions 22 is a bracket 21 which supports a platform 40 for receiving a mail piece 13 from the aforementioned weighing conveyer, and a plurality of springs 23. Attached to springs 23 are paired arms 24, there being pins 25 extending between and joining the paired arms 24, each pin 25 supporting an idler roller 26. The springs 23 have a first tang 27 that abuts the bracket 21 and a second tang 28 that is in engagement with the upper part of one of the paired arms 24. With this construction, the arms 24 are biased towards a mail piece 13. Because of the biasing action of the springs 23 upon the arms 24, the rollers 26 will engage a mail piece and urge it against the belt 29 until such time as the mail piece 13 exits the metering module 20. Further details of the metering module 20, and the manner in which the postage indicia is printed, need not be set forth herein for an understanding of the present invention.

Figure 2:
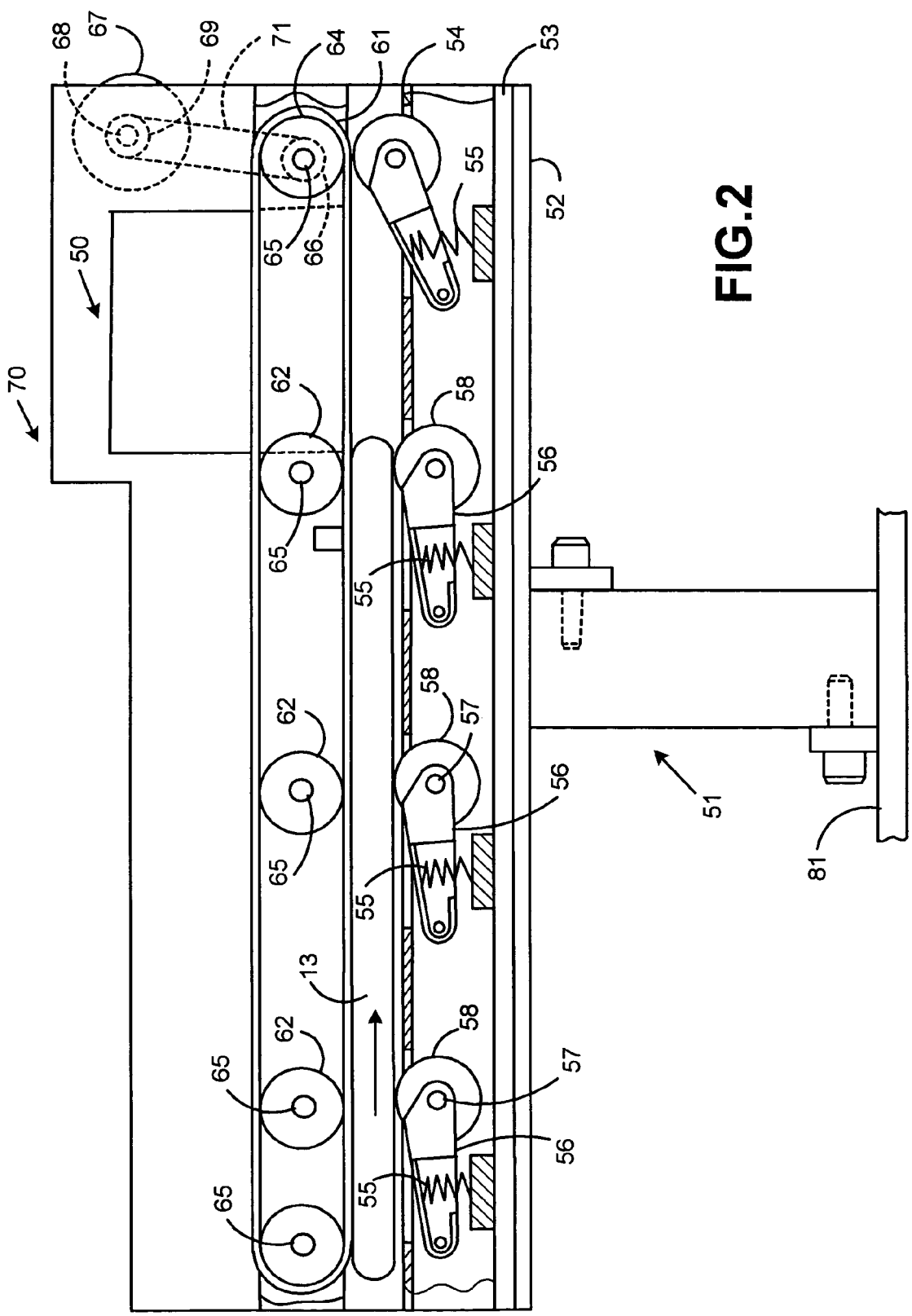
FIG. 2 is a side elevation view of the weighing conveyer which includes a metering module.

Referring to FIG. 2, the weighing conveyer 70 embodiment shown therein is provided with a printer 50 for printing a postage indicia. The weighing conveyer 70 is further comprised of a load cell 51 fixably mounted to frame 52, a bracket 53 which supports a platform 54 for receiving mail piece 13 from a suitable feeding module (not shown), a plurality of springs 55 to which paired arms 56 are attached, there being pins 57 extending between and joining the paired arms 56, each pin 57 supporting an idler roller 58. The plurality of springs 55 having a first tang 59 that abuts the bracket 53 and a second tang 60 that is in engagement with the upper part of one of the paired arms 56. With this construction, the arms 56 are biased towards a mail piece 13, shown in a position in which its weight would be determined by the load cell 51. Because of the biasing action of the springs 55 upon the arms 56, the rollers 58 will engage a mail piece 13 and urge it against belt 61 until such time as the mail piece 13 receives a postage indicia from printer 50 and exits the weighing conveyer 70.

Referring to FIGS. 1 and 2, the weighing conveyer 1, 70 includes drive means for moving the mail piece 13 along the platform 15, 54. Rotatably supported by each shaft 30, 65 are intermediate rollers 31, 62 and end rollers 32, 33, 63, 64 which act as support for belt 14, 61. The end roller 33, 64 has a shaft 30, 65 on which is mounted gear 35, 66. The conveyor 1, 70 generally includes a conventional motor 45, 67, such as a d.c. motor. The motor 45, 67 has a drive shaft 46, 68 on which is mounted a gear 34, 69. The motor gear 34, 69 transmits motion to gear 35, 66 by means of pulley 16, 71 thereby imparting rotation to belt 14, 61. Thus, it will be seen that rotation of the motor shaft 46, 68 and the pulley 16, 71 will drive the belt 14, 61 in a direction to move mail piece 13 across the surface of the platform 15, 54. To accurately control position of belt 14, 61, the conveyor 1, 70 may include a conventional motor controller and microprocessor (not shown). In general, control of the belt 14, 61 in order to keep the internal contents of the mail piece 13 from shifting is not considered as part of the subject invention nor as necessary for an understanding of the subject invention. However, it should be recognized that coupling the mail piece 13 to the belt 14, 61 in a controlled manner is advantageous in making a rapid and accurate determination of the mass of mail piece 13.

Figure 3:
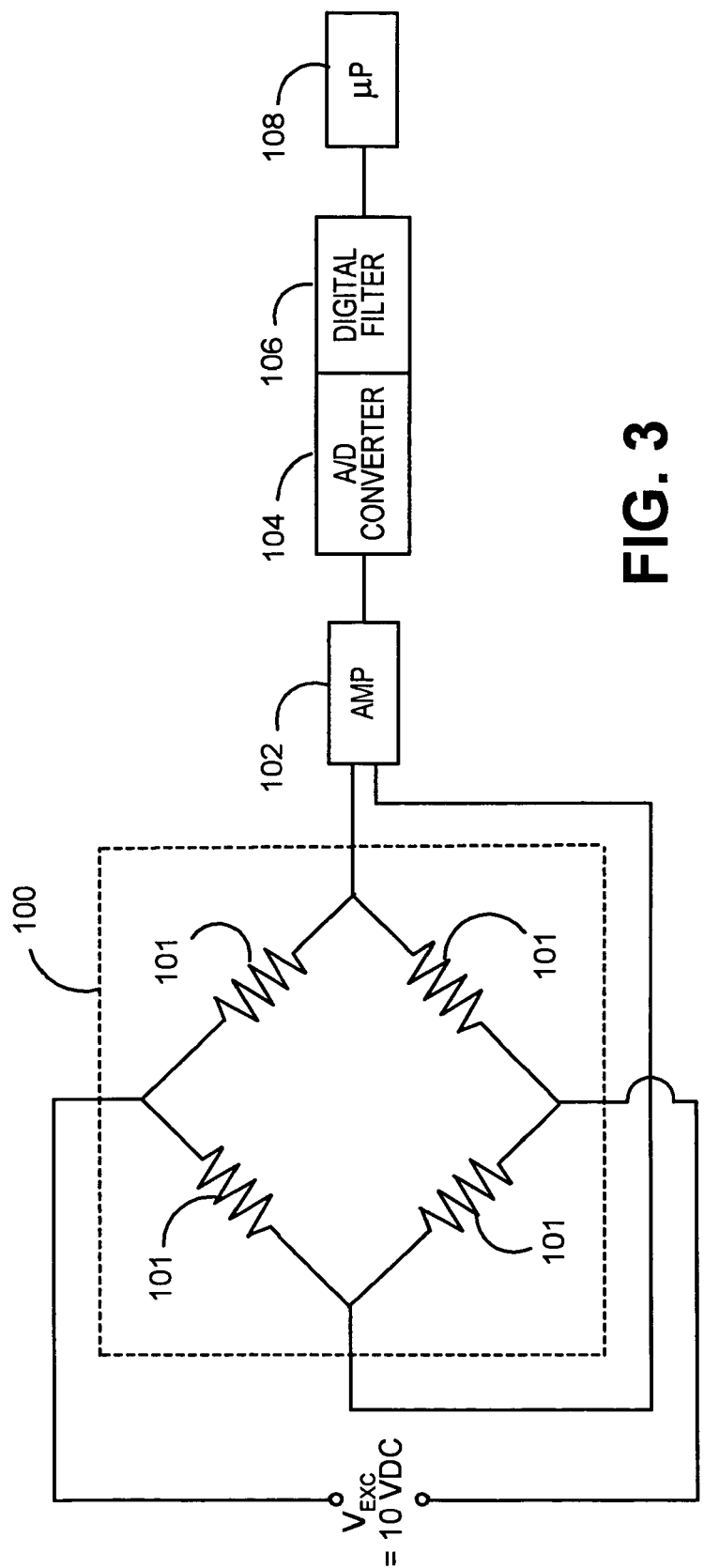
FIG. 3 shows the electronic circuitry of the load cell transducer.
Figure 4A:
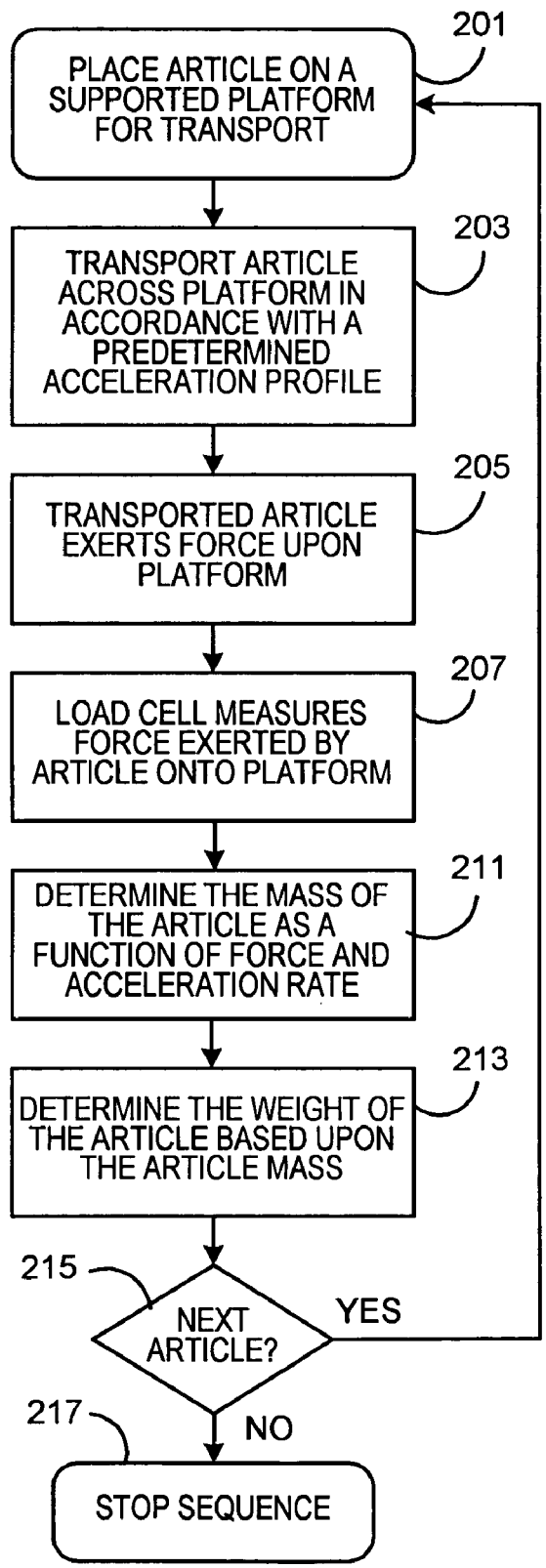
FIGS. 4a and 4b show flow charts illustrating the manner of determining the mass of the mail piece using the apparatus shown in FIG. 1.
Figure 4B:
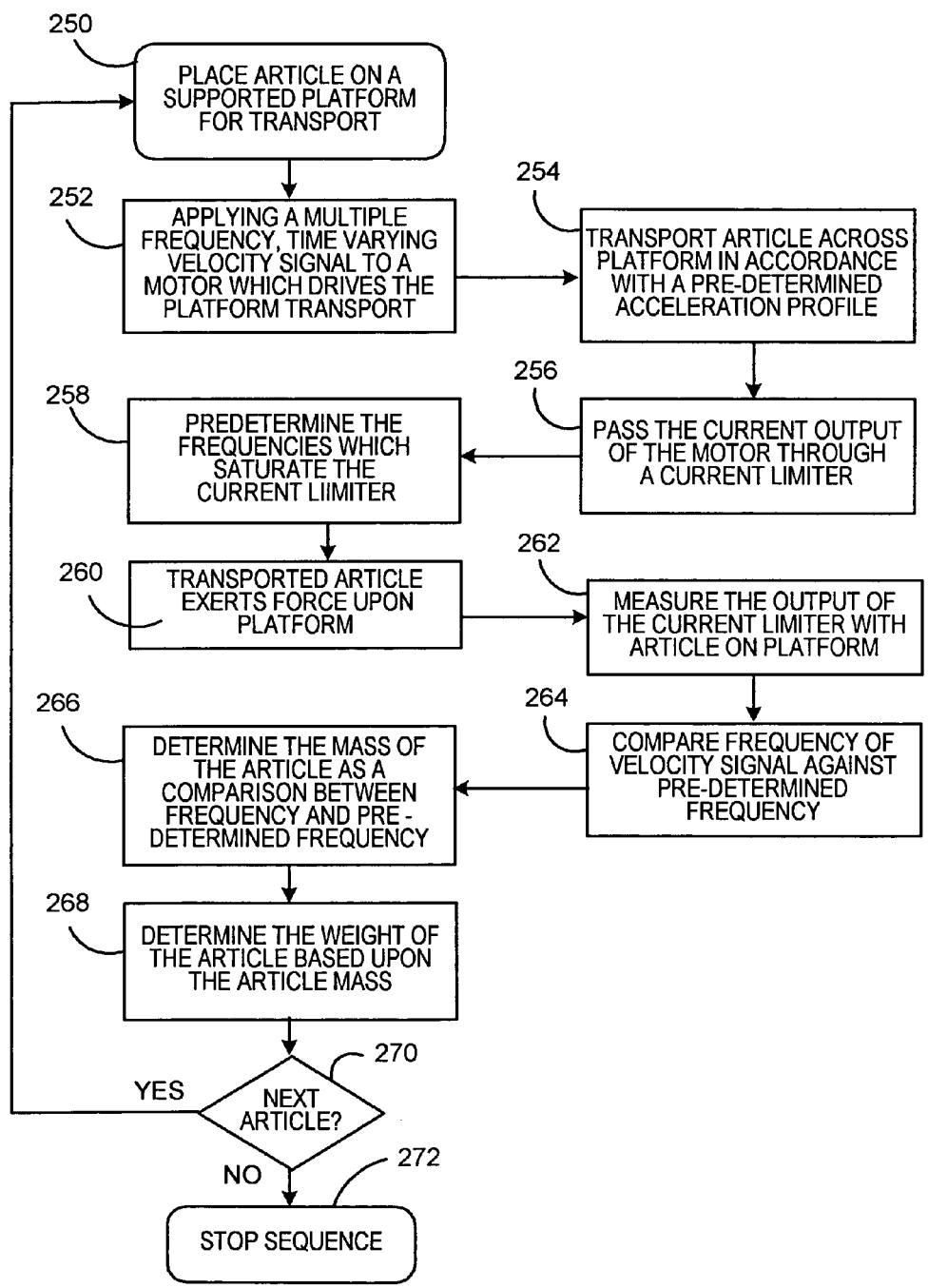

FIG. 3 shows circuitry that converts the mechanical displacement of the load cell 2 into a digital signal for further processing. Strain gage 100 comprises four strain sensors 101 that are physically fixed to load cell 2 in a conventional manner, and which are resisted elements whose resistance changes in response to strain in load cell 2. Sensors 101 are connected to form a bridge circuit that is excited with a DC voltage. The output of strain gage 100 is an analog electrical signal representative of the mechanical displacement of load cell 2 in response to the application of a horizontal force by the mail piece 13. The signal is amplified by amplifier 102 and then input to a commercially available analog-to-digital converter 104 where it is converted into a series of digital signals representative of samples of the analog signal.

Data from the load cell 2 is subject to errors from several sources, including external vibrations and electronic noise. Hence, the digital signals are processed by digital filter 106. Preferably such a filter would be a Kalman filter which may be implemented in a known manner in any of a number of commercially available microprocessors specially adapted for digital signal processing. The Kalman filter can factor into account the error sources and provide a filtered signal of the current mass of the mail piece 13 seen by the load cell 2. The filter 106 may eliminate high frequency electrical noise and low frequency mechanical noise from the signal received from the load cell 2. Signals that are output by the filter 106 are received by microprocessor 108 and processed to determine the mass of the mail piece 13.

The manner of determining the mass of the mail piece 13 will now be described using the embodiment of the invention illustrated in FIG. 1. A mail piece is conveyed along the platform 15 between belt 19 and rollers 9 at a velocity $V(t)=V_{avg}+V_a \cdot \sin \omega t$ where $V_{avg}$ is the average velocity of motor 45, $V_a$ is the amplitude of the sinusoidal varying velocity signal, and $\omega$ is the frequency of the sinusoidal voltage applied to motor 45. Without stopping or slowing down the mail piece 13, the load cell 2 measures the mass of the transported mail piece 13. The mail piece 13 is weighed as it moves at the transport velocity by adding a sinusoidal velocity profile to the desired constant transport velocity. This in turn produces a sinusoidal acceleration profile for motion of the mail piece 13. This acceleration profile produces a reaction load to ground, proportional to the mass of the mail piece 13, at the known forcing frequency. From this, one will be able to determine the mass of mail piece 13 in accordance with the formula:

$$F_{load\ cell} \propto m_{mail} \cdot a(t)$$

where $F_{load\ cell}$ is the horizontal force acting on the load cell 2, $m_{mail}$ is the mass of article 13, and $a(t)$ is the acceleration rate of the article 13.

An alternate method for determining the weight of a mail piece 13 being transported across the weighing conveyer 1 is to apply a multiple frequency, time-varying velocity signal to the motor 45. The multiple frequencies may be applied, for example, by using a Fourier Series velocity profile, a linear combination of velocity components at different frequencies, to excite the mail piece 13 at frequencies that saturate the load cell 2 at each of the postal weight breaks. Such a method requires torque limiting the motor 45 to prevent inadvertent overloading of the motor 45. The motor 45 assumes an almost constant torque mode when the predetermined weight break has been exceeded. By looking at the frequencies that are attenuated by the torque limit, it is straightforward to process the load cell signals frequency spectra and determine which weight break the mail might exceed. This allows for a faster determination of the mass of mail piece 13.

What is claimed is:

1. A method of determining the mass of a mail piece, the steps comprising:
   (a) supporting a platform and an associated means for transporting the mail piece across the platform,
   (b) orienting a load cell to measure a horizontal force applied to the load cell by the transported mail piece, (c) transporting the mail piece across the platform in accordance with a known acceleration profile without stopping the mail piece,
(d) measuring the horizontal force applied to the load cell by the mail piece, determining an acceleration rate of the mail piece,
(e) correlating the horizontal force with the acceleration rate for determining the mail piece mass, and
(f) determining the weight of the mail piece based upon the mail piece mass.

2. The method of claim 1 wherein the step of determining the weight of the mail piece is in accordance with the formula:

$$F_{load\ cell} \propto m_{mail} \cdot a(t)$$

wherein $F_{load\ cell}$ is the horizontal force applied to the load cell by the transported mail piece, $a(t)$ is the acceleration rate of the mail piece, and $m_{mail}$ is the mass of the mail piece.

3. The method of claim 2 including printing a postal indicia on the mail piece after determining the weight of the mail piece.

4. The method claimed in claim 3, wherein a postage meter prints the postal indicia.

5. The method claimed in claim 1, wherein the mail piece is transported by a conveyor belt.

* * * * *